Oct. 11, 1966  J. J. DWYER  3,277,942
LOCK NUTS HAVING REDUCED SINGLE HEXAGON WRENCHING SURFACES
Original Filed Sept. 11, 1959

INVENTOR
JAMES J. DWYER,
DECEASED, BY MARION D. DWYER,
EXECUTRIX

Richard A. Craig
ATTORNEY

United States Patent Office 3,277,942
Patented Oct. 11, 1966

3,277,942
LOCK NUTS HAVING REDUCED SINGLE
HEXAGON WRENCHING SURFACES
James J. Dwyer, deceased, late of Clark, N.J., by Marion
Dwyer, executrix, Clark, N.J., assignor to Elastic Stop
Nut Corporation of America, Union, N.J., a corporation of New Jersey
Continuation of application Ser. No. 839,341, Sept. 11,
1959. This application July 16, 1963, Ser. No. 299,446
9 Claims. (Cl. 151—21)

This application is a continuation of copending application Serial No. 839,341, filed September 11, 1959, now abandoned.

This invention relates to nuts and more particularly to a lock nut and still more particularly to a one-piece metal hexagon lock nut of minimum dimensions and weight.

It is known to provide a one-piece metal hexagon lock nut having a locking element and wrenching surfaces, but heretofore either (a) the locking element and the wrenching surfaces have been separate portions of the design, with the result that the nut is larger and heavier than it would be if it were not a lock nut, or (b) the wall of the locking element is so thick and rigid that the thread of a bolt or screw with which the nut is used is rapidly damaged or even destroyed and the elastic recovery of the locking element is insufficient to attain a satisfactory lock with a bolt thread at all bolt tolerance extremes on reuse of the nut.

The present invention overcomes the above deficiencies of the prior art and at the same time provides a one-piece metal hexagon lock nut of satisfactory wrenching and load-carrying and locking characteristics.

Important objects of the invention are to provide a one-piece metal lock nut having the above advantages, that is, which is smaller and lighter than prior art lock nuts of the same type and which is satisfactory with respect to wrenching, load carrying and locking characteristics and which at the same time is at least as good as nuts of the prior art as to those characteristics.

It has been found that the principles of the present invention do not apply to nuts of thread size larger than ⅜ inch. Therefore, the invention is limited to nuts of that thread size and smaller.

The invention is a one-piece metal lock nut comprising a metallic body of any given nominal thread size not larger than ⅜ inch and having an imperforate external wrenching surface of single hexagon form and of a predetermined radial across-the-flats dimension substantially less than the minimum standard across-the-flats dimension (as hereinafter defined) of a standard nut of said given nominal thread size. The wrenching surface has radially inwardly elastically deformed locking thread portions at one end of the nut, and an integral cylindrical flange at the other end of the nut of a diameter greater than the across-the-corners dimension of the wrenching surface.

The above and other objects and advantages will appear from the following description of two preferred examples of the invention and the accompanying drawings thereof in which.

Figure 1:
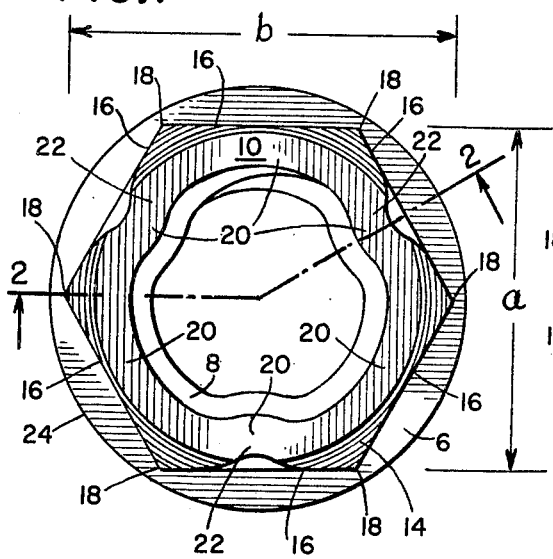
FIG. 1 is a plan view of a nut in accordance with the invention.
Figure 2:
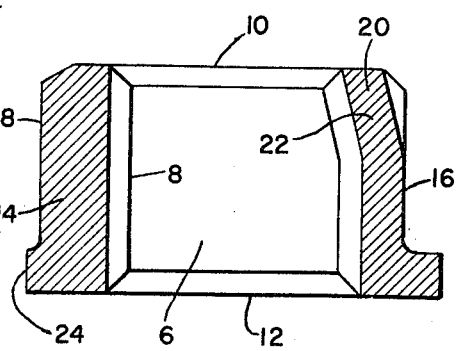
FIG. 2 is a view on line 2—2 of FIG. 1.

Reference is first made to FIGS. 1 and 2 which illustrate a one-piece metal lightweight lock nut comprising a metallic body 6 and having an internal thread 8 of predetermined thread size and defining a nut axis. Body 6 has first and second axial ends 10 and 12 and an imperforate annular wall 14 therebetween. Wall 14 has a plurality of external wrenching surfaces 16 which extend substantially from end 10 most of the way toward end 12 and are parallel to the nut axis and form a hexagon in sections perpendicular to the nut axis.

Adjacent pairs of surfaces 16 intersect each other at corners 18 parallel to and equidistant from the nut axis. Wall 14 thus has six locations of maximum thickness at corners 18 and six locations 20 of minimum thickness circumferentially between corners 18, and the hexagon formed by surfaces 16 has a predetermined across-the-flats dimension indicated at $a$ in FIG. 1 and a predetermined across-the-corners dimension indicated at $b$ in FIG. 1. Dimensions $a$ and $b$ are substantially less than the minimum standard across-the-flats and across-the-corners dimensions for the thread size of thread 8.

Standard across-the-flats and across-the-corners dimensions have long been established and adhered to in practice for the various thread sizes. The following table sets forth the standard across-the-flats and across-the-corners dimensions for nuts of the hexagon machine-screw and hexagon light series, as taken from Tables 135 and 114, respectively, of "Screw-Thread Standards for Federal Services Handbook H28 (1944)":

TABLE A

| Nut series | Thread Size | Standard Dimension (in.) | | |
|---|---|---|---|---|
| | | Across-the Flats | | Across-the-Corners, Minimum |
| | | Maximum | Minimum | |
| Hexagon Machine-Screw | 4 | .2500 | .241 | .275 |
| | 6 | .3125 | .302 | .344 |
| | 8 | .3438 | .332 | .378 |
| | 10 | .3750 | .362 | .413 |
| | ¼ in | .4375 | .423 | .482 |
| | ⁵⁄₁₆ in | .5625 | .545 | .621 |
| | ⅜ in | .6250 | .607 | .692 |
| Hexagon Light | ¼ in | .4375 | .428 | .488 |
| | ⁵⁄₁₆ in | .5000 | .489 | .557 |
| | ⅜ in | .5625 | .551 | .628 |

For purposes of the present invention, for those thread sizes for which there are more than one heretofore standard across-the-flats and across-the-corners dimensions, the least are deemed the minimum standard dimensions.

From the foregoing it appears that, as defined herein, the minimum standard across-the-flats and across-the corners dimensions for a nut of each thread size referred to are as follows:

TABLE B

| Thread Size | Minimum Standard Dimensions (in.) | |
|---|---|---|
| | Across-the-Flats | Across-the-Corners |
| 4 | .241 | .275 |
| 6 | .302 | .344 |
| 8 | .332 | .378 |
| 10 | .362 | .413 |
| ¼ in | .423 | .482 |
| ⁵⁄₁₆ in | .489 | .557 |
| ⅜ in | .551 | .628 |

Wall 14 and thread 8 are deformed toward the nut axis at three similar deformed places 22 evenly spaced circumferentially around body 6, each of which extends axially from end 10 less far toward end 12 than wrenching surfaces 16. Preferably and as shown deformed places 20 are circumferentially centered between adjacent pairs of corners 18, at locations 20 of minimum thickness, so that wall 14 is relatively very flexible at deformed places 22.

Thus as an externally threaded member is turned into screw threaded engagement with the nut from end 12 thereof, deformed places 22 will be elastically flexed away from the nut axis and thread 8 at deformed places 22 will establish a frictional grip on the thread of the externally threaded member, thus to provide the desired locking feature. There can be fewer or more deformed places 22 than shown.

Body 6 also has an external circumferential flange 24 extending from end 12 toward and integral with wrenching surfaces 16 and forming a base for the nut. Flange 24 has an external diameter greater than dimension $b$ and preferably less than the minimum standard across-the-corners dimension. Flange 24 provides sufficient bearing area for the nut base and also provides rigidity against tensile loading and hoop stress.

In the nut of FIGS. 1 and 2 the hexagon formed by surfaces 16 is circumferentially continuous, except for insignificant interruptions at deformed places 22.

Figure 3:
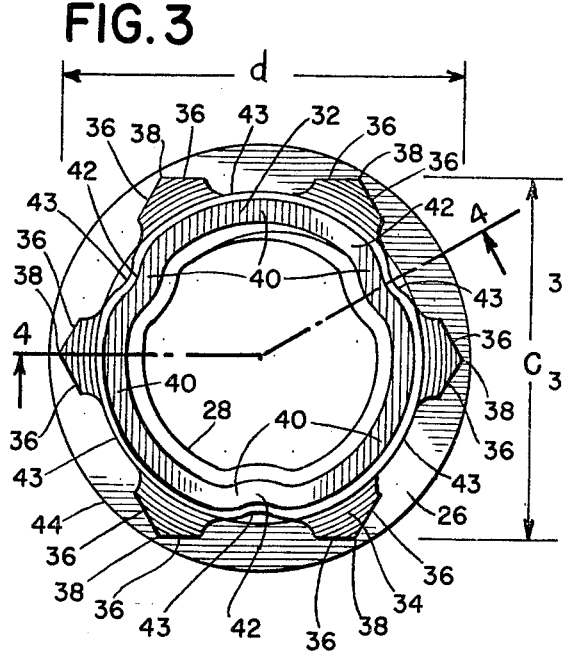
FIG. 3 is a plan view of another nut in accordance with the invention.
Figure 4:
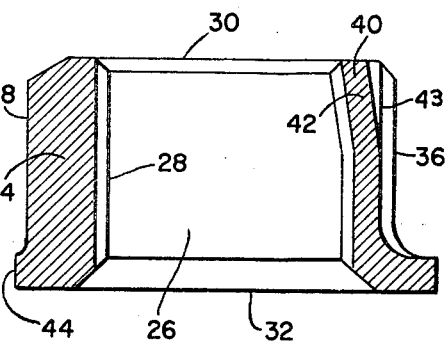
FIG. 4 is a view on line 4—4 of FIG. 3.

FIGS. 3 and 4 illustrate a second form of nut in accordance with the invention comprising a metallic body 26 and having an internal thread 28 of predetermined thread size and defining a nut axis. Body 26 has first and second axial ends 30 and 32 and an imperforate annular wall 34 therebetween. Wall 34 has a plurality of external wrenching surfaces 36 which extend from substantially end 30 most of the way toward end 32 and are parallel to the nut axis and define a hexagon in sections perpendicular to the nut axis.

Adjacent pairs of surfaces 36 intersect each other at corners 38 parallel to and equidistant from the nut axis. Wall 34 thus has six locations of maximum thickness at corners 38 and six locations 40 of minimum thickness circumferentially between corners 38, and the hexagon defined by surfaces 36 has a predetermined across-the-flats dimension indicated at $c$ in FIG. 3 and a predetermined across-the-corners dimension indicated at $d$ in FIG. 3. Dimensions $c$ and $d$ are substantially less than the corresponding minimum standard dimensions for the thread size of thread 28.

Wall 34 and thread 28 are deformed toward the nut axis at three similar deformed places 42 evenly spaced circumferentially around body 26, each of which extends axially from end 30 less far toward end 32 than wrenching surfaces 36. Preferably and as shown deformed places 42 are circumferentially centered between adjacent pairs of corners 38, at locations 40 of minimum thickness, so that wall 34 is relatively very flexible at deformed places 42. Thus as an externally threaded member is turned into screw threaded engagement with the nut from end 32 thereof, deformed places 42 will be elastically flexed away from the nut axis and thread 28 at deformed places 42 will establish a frictional grip on the thread of the externally threaded member, thus to provide the desired locking feature. There can be fewer or more deformed places 42 than shown.

In order to increase the flexibility of deformed places 42 of the nut of FIGS. 3 and 4 the hexagon defined by surfaces 36 is circumferentially discontinuous at end 30, and to achieve the discontinuity, wall 34 is provided with an external hollowed-out recess 43 between each circumferentially adjacent pair of corners 38. As shown recesses 43 are axially coextensive with surfaces 36 and the exterior of wall 34 at recesses 43 is located entirely within the hexagon defined by surfaces 36.

Body 26 also has an external circumferential flange 44 extending from end 32 toward and integral with surfaces 36 and forming a base for the nut. Flange 44 has an external diameter greater than dimension $d$ and preferably less than the minimum standard across-the-corners dimension. Flange 44 provides sufficient bearing area for the nut base and also provides rigidity against tensile loading and hoop stress.

It is important that dimensions $a$, $b$, $c$, and $d$ coincide with corresponding dimensions of a wrench of standard size for each thread size, in order that special wrenches need not be provided. It is also important that the thicknesses of walls 14 and 34 at deformed places 22 and 44 be sufficiently small that the desired locking action takes place. For certain thread sizes it has been found that a nut in accordance with FIGS. 1 and 2 can be dimensioned to accommodate a wrench of standard size to provide adequate wrenching characteristics and also to provide the desired wall thinness at the deformed places. For other thread sizes it has been found that, in order to provide adequate wrenching and locking characteristics and at the same time to accommodate a wrench of standard dimensions, a nut in accordance with FIGS. 3 and 4 is desirable. The following table gives dimensions $a$ and $b$ or $c$ and $d$ for typical nuts of various thread sizes in accordance with the invention:

TABLE C

| Thread Size | Nut in Accordance With Figs.— | Dimension (in.) | |
|---|---|---|---|
| | | a or c | b or d (minimum) |
| 4 | 3 and 4 | .153–.159 | .175 |
| 6 | 3 and 4 | .184–.190 | .210 |
| 8 | 3 and 4 | .216–.222 | .248 |
| 10 | 3 and 4 | .245–.253 | .279 |
| ¼ | 1 and 2 | .309–.316 | .351 |
| ⁵⁄₁₆ | 1 and 2 | .370–.378 | .424 |
| ⅜ | 1 and 2 | .433–.441 | .496 |

The following table gives the minimum percent reduction of the across-the-flats dimensions of the wrenching surfaces of the nuts of Table C with respect to the minimum standard across-the-flats dimensions of Table B:

TABLE D

Thread Size:      Minimum Percent Reduction
4 ........................................... 34.0
6 ........................................... 37.1
8 ........................................... 33.1
10 .......................................... 30.1
¼ ........................................... 25.3
⁵⁄₁₆ ......................................... 22.7
⅜ ........................................... 19.9

Thus, the smallest percent reduction is shown by the ⅜ inch nut, for which the across-the-flats dimension is not greater than 80.1 percent of the minimum standard across-the-flats dimension.

The following table gives the standard minimum major thread diameters, i.e., nominal thread sizes, of nuts of Table C:

TABLE E

Thread Size:      Minimum Major Thread Diameter (in.)
4 ........................................... 0.112
6 ........................................... 0.138
8 ........................................... 0.164
10 .......................................... 0.190
¼ ........................................... 0.250
⁵⁄₁₆ ......................................... 0.3125
⅜ ........................................... 0.375

The following table gives the differences between the maximum across-the-flats dimensions and the minimum major thread diameters of the nuts of Tables C and E:

TABLE F

Thread Size:      Difference (in.)
4 ........................................... 0.047
6 ........................................... 0.052
8 ........................................... 0.058
10 .......................................... 0.063
¼ ........................................... 0.066
⁵⁄₁₆ ......................................... 0.0655
⅜ ........................................... 0.066

Thus, for nuts according to the invention, the difference between the maximum across-the-flats dimension and the minimum major thread diameter is not greater than 0.066 inch.

It is noteworthy that flange 24 of the nut of FIGS. 1 and 2 is joined to the remainder of the nut by a fillet and that flange 44 of the nut of FIGS. 3 and 4 is joined to the remainder of the nut by a fillet. In each case the fillet provides strength for transmitting wrenching torque to the base of the nut without a weakening notch. And in each case the flange provides for the compressive loads in the nut wall, which, when the nut is loaded, gradually increase toward the base of the nut. The blending provided by the fillet is essential to proper functioning of the nut, both from the standpoint of wrenching loads and compressive loads.

The following table gives the nominal sizes of standard open end wrenches for use on single hexagon nuts of minimum standard across-the-flats dimensions for the various nominal thread sizes and for use on nuts of the present invention:

TABLE G

| Thread Size | Standard Wrench Size (in.) | |
|---|---|---|
| | Standard Nuts | Nuts of the Present Invention |
| 4 | 1/4 | 5/32 |
| 6 | 5/16 | 3/16 |
| 8 | 11/32 | 7/32 |
| 10 | 3/8 | 1/4 |
| 1/4 | 7/16 | 9/16 |
| 5/16 | 1/2 | 3/8 |
| 3/8 | 9/16 | 7/16 |

From Table G, it appears that for each nut of the present invention the single hexagon wrenching surface is sufficiently small to accommodate a standard wrench at least as small as the wrench required for a standard nut of at least two smaller thread sizes.

Columns 2 and 3 of Table G also give, respectively, for the thread sizes of Column 1 of Table G, the nominal across-the-flats sizes of the hexagon wrenching surfaces of single hexagon nuts of minimum standard across-the-flats dimensions and the nominal across-the-flats sizes of the hexagon wrenching surfaces of the nuts of Table C.

To summarize, a self-locking nut according to the present invention has a unique combination of features which provide adequate locking characteristics, adequate wrenching characteristics with no need for special wrenches and adequate strength, all within exceptionally small envelope dimensions. This is accomplished by combining the functions of the various parts of the nut in such a way that great compactness is achieved.

In a nut according to the invention the flange provides: bearing area which could not be provided by a hexagonal base of the same across-the-flats and across-the-corners dimensions as the wrenching surface; structure resistant to hoop tensions which are developed when the nut is loaded which could not be properly resisted by a hexagonal base of the same across-the-flats and across-the-corners dimensions as the wrenching surfaces; and maximum strength at the zone of highest loading.

The hexagonal or hexagonal-like body provides a wrenchable structure within the smallest possible dimensions consistent with the high strength desired. Since wrenching loads are sustained principally by the corners, the material between such corners may be quite thin with no loss of wrenching strength, in order to achieve exceptional lightweight and high strength. The utilization of hexagon dimensions substantially below standard also enables the local flexibility needed for adequate locking characteristics to be achieved.

It is to be noted too that while in the illustrated nuts the wrenching surfaces intersect each other at angles of 120°, this need not be so. Even 90° intersections would provide adequate wrench engagements. Other variations are also possible.

The details of the disclosed examples of the invention are not to be taken as limitations upon the invention except as those details may be included in the appended claims, since many changes which will occur to those skilled in the art can be made without departing from the invention.

What is claimed is:

1. A one-piece metal lightweight lock nut of a nominal thread size not larger than 3/8 inch and having an imperforate external wrenching surface of single hexagon form and of a predetermined radial across-the-flats dimension of a nominal size ($a$) at least 3/32 inch less than the nominal across-the-flats size of the hexagon wrenching surface of a single hexagon nut of minimum standard across-the-flats dimension for the same nominal thread size, and ($b$) large enough to provide a minimum wall thickness sufficient to provide the desired axial strength, and said wrenching surface having radially inwardly elastically deformed locking thread portions at one end of the nut, and an integral cylindrical flange at the other end of the nut of a diameter greater than the across-the-corners dimension of the wrenching surface.

2. The invention set forth in claim 1 wherein said locking thread portions are located circumferentially midway between certain of the corners of the single hexagon form wrenching surface and are evenly spaced circumferentially.

3. The invention set forth in claim 1 wherein the single hexagon form wrenching surface is circumferentially continuous.

4. The invention set forth in claim 1 wherein the single hexagon form wrenching surface is circumferentially discontinuous.

5. The invention set forth in claim 1 wherein the diameter of said flange is less than the minimum standard across-the-corners dimension for a nut of the same nominal thread size and said flange is joined to said external wrenching surface by a fillet.

6. A one-piece metal lightweight lock nut of a nominal thread size not larger than 3/8 inch and having an imperforate external wrenching surface of single hexagon form and of a predetermined radial across-the-flats dimension of a nominal size at least 3/32 inch and not more than 1/8 inch less than the nominal across-the-flats size of the hexagon wrenching surface of a single hexagon nut of minimum standard across-the-flats dimension for the same nominal thread size, and said wrenching surface having radially inwardly elastically deformed locking thread portions at one end of the nut, and an integral cylindrical flange at the other end of the nut of a diameter greater than the across-the-corners dimension of the wrenching surface.

7. A one-piece metal lightweight lock nut of a nominal thread size not larger than 3/8 inch and having an imperforate external wrenching surface of single hexagon form and of a predetermined radial across-the-flats dimension of a nominal size ($a$) at least 3/32 inch less than the nominal across-the-flats size of the hexagon wrenching surface of a single hexagon nut of minimum standard across-the-flats dimension for the same nominal thread size, and ($b$) greater than said nominal thread size, and ($c$) to fit a standard wrench, and said wrenching surface having radially inwardly elastically deformed locking thread portions at one end of the nut, and an integral cylindrical flange at the other end of the nut of a diameter greater than the across-the-corners dimension of the wrenching surface.

8. A one-piece metal lightweight lock nut of a nominal thread size not larger than 3/8 inch and having an imperforate external wrenching surface of single hexagon form and of a predetermined radial across-the-flats dimension in a range between ($a$) 81 percent of and ($b$) 1/8 inch less than, the across-the-flats dimension of the hexagon wrenching surface of a single hexagon nut of minimum standard across-the-flats dimension for the same nominal thread size, and said wrenching surface having radially inwardly elastically deformed locking thread portions at one end of the nut, and an integral cylindrical flange at the other end of the nut of a diameter greater than the across-the-corners dimension of the wrenching surface.

9. A one-piece metal lightweight lock nut of a nominal thread size not larger than ⅜ inch and having an imperforate external wrenching surface of single hexagon form and of a predetermined radial across-the-flats dimension which exceeds said nominal thread size by an amount in the range of which the upper limit is about 0.066 inch and the lower limit is about 0.047 inch, and said wrenching surface having radially inwardly elastically deformed locking thread portions at one end of the nut, and an integral cylindrical flange at the other end of the nut of a diameter greater than the across-the-corners dimension of the wrenching surface.

References Cited by the Examiner
UNITED STATES PATENTS

| | | | |
|---|---|---|---|
| D. 134,789 | 1/1943 | Gade | 151—21 |
| 2,440,944 | 9/1948 | Green | 151—21 |
| 2,452,192 | 10/1948 | Hosking | 151—21 |
| 2,588,372 | 3/1952 | Erb | 151—21 |
| 2,679,879 | 6/1954 | Engstrom | 151—21 |
| 2,897,867 | 8/1959 | La Torre | 151—21 |
| 3,062,252 | 11/1962 | Jackman | 151—38 |
| 3,079,830 | 3/1963 | Faroni et al. | 151—21 |

CARL W. TOMLIN, *Primary Examiner.*

W. H. WOOD, Jr., E. C. ALLEN, *Examiners.*